United States Patent
Li et al.

(10) Patent No.: US 12,196,174 B1
(45) Date of Patent: Jan. 14, 2025

(54) METHOD AND SYSTEM FOR CALCULATING STABILITY MARGIN DOMAIN OF CONTROL PARAMETERS OF HYDRAULIC TURBINE REGULATING SYSTEM

(71) Applicant: HUAZHONG UNIVERSITY OF SCIENCE AND TECHNOLOGY, Hubei (CN)

(72) Inventors: Chaoshun Li, Hubei (CN); Xueding Lu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/665,599

(22) Filed: May 16, 2024

(30) Foreign Application Priority Data

Nov. 30, 2023 (CN) .......................... 202311620271.2

(51) Int. Cl.
 *F03B 15/12* (2006.01)
(52) U.S. Cl.
 CPC ........ *F03B 15/12* (2013.01); *F05B 2270/706* (2013.01)
(58) Field of Classification Search
 CPC .......................... F03B 15/12; F05B 2270/706
 See application file for complete search history.

(56) References Cited

U.S. PATENT DOCUMENTS

| | | | | | |
|---|---|---|---|---|---|
| 5,517,422 | A * | 5/1996 | Ilic | ............................ | H02J 3/06 700/286 |
| 5,555,279 | A * | 9/1996 | Nir | ........................... | G21C 7/36 376/241 |
| 6,476,521 | B1 * | 11/2002 | Lof | ......................... | H02J 3/241 307/105 |
| 8,595,162 | B2 * | 11/2013 | Al-Duwaish | ........ | G05B 13/027 706/19 |
| 9,529,057 | B2 * | 12/2016 | Shrestha | .............. | G01R 31/343 |

(Continued)

FOREIGN PATENT DOCUMENTS

| | | |
|---|---|---|
| CN | 113162096 | 7/2021 |
| CN | 114352469 | 4/2022 |

*Primary Examiner* — Pedro J Cuevas
(74) *Attorney, Agent, or Firm* — JCIPRNET

(57) ABSTRACT

The disclosure provides a method and a system for calculating a stability margin domain of the control parameters of a hydraulic turbine regulating system, which belongs to the technical field of stability margin analysis of the hydraulic turbine regulating system. The method includes: determining a high-order state space model of the hydraulic turbine regulating system; determining a dominant eigenvalue and an interference eigenvalue of a state matrix of the high-order state space model; determining an associated state variable of the interference eigenvalue; determining the interference eigenvalues under different target control parameter conditions; determining whether a target control parameter meets a stability margin requirement; and determining the stability margin domain of the control parameter. The present disclosure can accurately calculate the stability margin domain of the complex hydraulic turbine system and help operators quickly identify the control parameters adjustment range meeting adjustment and attenuation requirements of the system.

8 Claims, 7 Drawing Sheets

(56) References Cited

U.S. PATENT DOCUMENTS

| | | | | |
|---|---|---|---|---|
| 10,228,401 B2* | 3/2019 | Wilson | ............... | G01R 25/00 |
| 10,355,485 B2* | 7/2019 | Roberson | ............... | H02J 3/18 |
| 10,437,214 B1* | 10/2019 | Fan | ............... | G05B 19/042 |
| 10,809,678 B2* | 10/2020 | Nasirian | ............... | G05B 15/02 |
| 10,971,937 B2* | 4/2021 | Khajehoddin | ............... | H02J 3/24 |
| 11,799,290 B2* | 10/2023 | Londono | ............... | H02J 3/48 |
| 2011/0257800 A1* | 10/2011 | Al-Hamouz | ............... | H02J 3/06 |
| | | | | 700/32 |
| 2013/0054500 A1* | 2/2013 | Al-Duwaish | ............... | G05B 13/027 |
| | | | | 706/19 |
| 2014/0032138 A1* | 1/2014 | Shrestha | ............... | G01R 31/40 |
| | | | | 702/58 |
| 2016/0003879 A1* | 1/2016 | Wilson | ............... | H02J 3/241 |
| | | | | 324/76.12 |
| 2016/0099567 A1* | 4/2016 | Sun | ............... | H02J 3/144 |
| | | | | 700/296 |
| 2016/0276830 A1* | 9/2016 | Nasirian | ............... | G05B 15/02 |
| 2018/0254109 A1* | 9/2018 | Cheatham, III | ............... | G21C 1/026 |
| 2018/0309292 A1* | 10/2018 | Roberson | ............... | G01R 35/02 |
| 2019/0109461 A1* | 4/2019 | Khajehoddin | ............... | H02M 1/42 |
| 2020/0293627 A1* | 9/2020 | Wang | ............... | G06F 30/367 |
| 2020/0327264 A1* | 10/2020 | Wang | ............... | H02J 3/008 |
| 2022/0149627 A1* | 5/2022 | Londono | ............... | H02J 3/381 |

* cited by examiner

METHOD AND SYSTEM FOR CALCULATING STABILITY MARGIN DOMAIN OF CONTROL PARAMETERS OF HYDRAULIC TURBINE REGULATING SYSTEM

CROSS-REFERENCE TO RELATED APPLICATION

This application claims the priority benefit of China application serial no. 202311620271.2, filed on Nov. 30, 2023. The entirety of the above-mentioned patent application is hereby incorporated by reference herein and made a part of this specification.

BACKGROUND

Technical Field

The disclosure belongs to the technical field of stability margin analysis of a hydraulic turbine regulating system, and more specifically relates to a method and a system for calculating a stability margin domain of the control parameters of a hydraulic turbine regulating system.

Description of Related Art

Reasonable adjustment of the control parameters enables an oscillation of a regulating system to quickly attenuate, which is crucial to a long-term safe and stable operation of the unit. Determining a safe adjustment range of the control parameter of the hydraulic turbine regulating system such that the control parameter has sufficient stability margin is the basis and the core work for guiding parameter adjustment. In the past, most calculation methods for the stability margin domain are aimed at simple systems and highly reduced order models. However, many large hydropower stations are set up with long underground water diversion pipelines. In order to save construction costs of underground caverns, water diversion systems mostly adopt a multi-machine common pipeline layout. The complexity of such a hydraulic turbine regulating system is much higher than that of a single-machine regulating system. There is complex hydraulic coupling between the units. At the same time, the hydraulic oscillation introduced by the setting of a pressure regulating well makes it more difficult to analyze the characteristics of the regulating system. As the complexity of the system increases, the simple system stability margin solution method faces issues such as significant decrease in accuracy and even inability to calculate. Therefore, designing a method that can accurately calculate the stability margin domain of the control parameter of a complex hydraulic turbine regulating system is extremely important for the setting of the control parameter of a complex hydropower system.

SUMMARY

In view of the shortcomings of the prior art, objectives of the disclosure are to provide a method and a system for calculating a stability margin domain of the control parameters of a hydraulic turbine regulating system to solve the issue that a traditional hydraulic turbine regulating system stability margin solution method has low accuracy in calculating or even inability to calculate the stability margin domain of a complex hydraulic turbine regulating system.

In order to achieve the above objective, in a first aspect, the disclosure provides a method for calculating a stability margin domain of the control parameters of a hydraulic turbine regulating system, which includes the following steps.

In step 1, a high-order state space model of the hydraulic turbine regulating system is constructed. The hydraulic turbine regulating system includes a PID governor, a water diversion module including a pressure regulating well, a hydraulic turbine, and a generator module.

In step 2, a set of the control parameter is randomly selected within a PI stability domain, a conjugate pole without any zero within a preset distance and closest to an imaginary axis is found in a zero-pole distribution diagram after converting the high-order state space model as a dominant eigenvalue, and an eigenvalue closer to the imaginary axis than the dominant eigenvalue is determined as an interference eigenvalue.

In step 3, a participation factor of each state quantity in the hydraulic turbine regulating system to the interference eigenvalue is calculated, and the state variable corresponding to the participation factor exceeding a preset value is determined as an associated state variable of the interference eigenvalue.

In step 4, a target control parameter is input into the high-order state space model to calculate an eigenvalue, and a certain eigenvalue is judged as the interference eigenvalue if a ratio of a participation factor of the associated state variable to the certain eigenvalue is more than 50% of the participation factor of all the state variables to the certain eigenvalue.

In step 5, whether a real part of the eigenvalue after removing the interference eigenvalue is all less than-m is judged. If yes, the target control parameter meets a stability margin requirement, where m is the stability margin requirement.

In step 6: the control parameters (0,0) is moved according to a step size, the target control parameter is updated by adopting the control parameters obtained after each movement, and step 4 is proceeded until all target control parameter sets meeting the stability margin requirement are obtained to form a parameter stability margin domain.

Further preferably, step 2 specifically includes the following steps.

In step 2.1, the set of the control parameters is randomly selected within the PI stability domain, and the control parameter and a system parameter are substituted into the high-order state space model to solve for the eigenvalue; and the high-order state space model is then converted into a zero-pole model based on the solved eigenvalue to construct the zero-pole distribution diagram.

In step 2.2, the conjugate pole closest to the imaginary axis and without any zero nearby is found as the dominant eigenvalue according to a pole and a zero in the zero-pole distribution diagram, and the pole or the zero with a real part being greater than a real part of the dominant eigenvalue is taken as the interference eigenvalue.

Further preferably, a calculation method of the participation factor is:

$$\phi_{i,k} = \left| \frac{v_{i,k} u_{i,k}}{V_k^T U_k} \right|$$

$$V_k^T A = \lambda_k V_k, \quad A U_k = \lambda_k U_k$$

where $\phi_{i,k}$ is a participation factor of an i-th state variable of the system to a k-th eigenvalue, $V_k$ and $U_k$ are respectively a left eigenvector and a right eigenvector corresponding to an eigenvalue $\lambda_k$, and $v_{i,k}$ and $u_{i,k}$ are respectively i-th row elements of $V_k$ and $U_k$.

Further preferably, step 4 specifically includes the following steps.

In step 4.1, the target control parameter is input into the high-order state space model to solve for an eigenvalue of a state matrix.

In step 4.2: the participation factor of all the state variables to all the eigenvalues are calculated using the participation factor.

In step 4.3: a ratio $$\phi_{g,k} / \sum_{i=1}^{n} \phi_{i,k}$$

of a participation factor of a current state variable to a current eigenvalue in the participation factor of all the state variables to the current eigenvalue is calculated, and the current eigenvalue is considered to be the interference eigenvalue if $$\phi_{g,k} / \sum_{i=1}^{n} \phi_{i,k} > 0.5,$$

where $\phi_{g,k}$ is a participation factor of a current g-th state variable to a current k-th eigenvalue and n is a total number of eigenvalues.

In step 4.4, the current eigenvalue is updated to a next eigenvalue, and step 4.3 is executed until all the interference eigenvalue is found.

Further preferably, step 6 specifically includes the following steps.

In step 6.1, a PI stability domain plane coordinate origin (0,0) is taken as a reference point, a value $K_p$ is kept constant, a step size $dk_i$ in a direction $K_i$ is given, a next target control parameter (0, $K_i = K_i + dk_i$) in the direction $K_i$ is found and substituted into the high-order state space model, whether the target control parameter meets the stability margin requirement is judged according to step 4 and step 5, and $K_i$ is continuously updated according to $dk_i$ until a critical stability value of the maximum $K_i$ under the current $K_p$ is updated.

In step 6.2, a step size $dk_p$ in the direction $K_p$ is given, $K_p = K_p + dk_p$ is updated, step 6.1 is returned to, all the stability value $K_i$ under the current $K_p$ are calculated until $K_p$ reaches the maximum stability value $K_p$; and the set of all the control parameters meeting the stability margin requirement is constructed as the parameter stability margin domain.

$K_p$ is a proportional coefficient and $K_i$ is an integral coefficient.

In a second aspect, the disclosure provides a system for calculating a stability domain of the control parameters of a hydraulic turbine regulating system, which includes the following.

A construction module of a high-order state space model is used to construct the high-order state space model of the hydraulic turbine regulating system. The hydraulic turbine regulating system includes a PID governor, a water diversion module including a pressure regulating well, a hydraulic turbine, and a generator module.

An eigenvalue screening module is used to randomly select a set of control parameter within a PI stability domain, find a conjugate pole without any zero within a preset distance and closest to an imaginary axis in a zero-pole distribution diagram after converting the high-order state space model as a dominant eigenvalue, and determine an eigenvalue closer to the imaginary axis than the dominant eigenvalue as an interference eigenvalue.

An associated state variable obtaining module is used to calculate a participation factor of each state quantity in the hydraulic turbine regulating system to the interference eigenvalue, and determine the state variable corresponding to the participation factor exceeding a preset value as an associated state variable of the interference eigenvalue.

An interference eigenvalue inverse solution module is used to input a target control parameter into the high-order state space model to calculate an eigenvalue, and judge a certain eigenvalue as the interference eigenvalue if a ratio of a participation factor of the associated state variable to the certain eigenvalue is more than 50% of the participation factors of all the state variables to the certain eigenvalue.

A stability margin judgement module is used to judge whether a real part of the eigenvalues after removing the interference eigenvalue is all less than-m. If yes, the target control parameter meets a stability margin requirement, where m is the stability margin requirement.

A target control parameter updating module is used to move the control parameters (0,0) according to a step size, and update the target control parameter by adopting the control parameters obtained after each movement.

The set of all the control parameters meeting the stability margin requirement forms the parameter stability margin domain.

Further preferably, the eigenvalue screening module includes the following.

A zero-pole distribution diagram construction unit is used to randomly select the set of the control parameters within the PI stability domain, and substitute the control parameter and a system parameter into the high-order state space model to solve for the eigenvalue; and then convert the high-order state space model into a zero-pole model based on the solved eigenvalue to construct the zero-pole distribution diagram.

An eigenvalue confirmation unit is used to find the conjugate pole closest to the imaginary axis and without any zero nearby as the dominant eigenvalue according to a pole and a zero in the zero-pole distribution diagram, and take the pole or the zero with a real part being greater than a real part of the dominant eigenvalue as the interference eigenvalue.

Further preferably, a calculation method of the participation factor in the associated state variable obtaining module is:

$$\phi_{i,k} = \left| \frac{v_{i,k} u_{i,k}}{V_k^T U_k} \right|$$

$$V_k^T A = \lambda_k V_k, \quad A U_k = \lambda_k U_k$$

where $\phi_{i,k}$ is a participation factor of an i-th state variable of the system to a k-th eigenvalue, $V_k$ and $U_k$ are respectively a left eigenvector and a right eigenvector corresponding to an eigenvalue $\lambda_k$, and $v_{i,k}$ and $u_{i,k}$ are respectively i-th row elements of $V_k$ and $U_k$.

Further preferably, the interference eigenvalue inverse solution module includes the following.

An eigenvalue solution module is used to input the target control parameter into the high-order state space model to solve for an eigenvalue of a state matrix.

A participation factor calculation unit is used to calculate the participation factors of all the state variables to all the eigenvalues using the participation factors.

An interference feature confirmation unit is used to calculate a ratio $$\phi_{g,k} / \sum_{i=1}^{n} \phi_{i,k}$$

of a participation factor of a current state variable to a current eigenvalue in the participation factors of all the state variables to the current eigenvalue, and consider the current eigenvalue to be the interference eigenvalue if $$\phi_{g,k} / \sum_{i=1}^{n} \phi_{i,k} > 0.5,$$

where $\phi_{g,k}$ is a participation factor of a current g-th state variable to a current k-th eigenvalue and n is a total number of eigenvalues.

An iterative driving unit is used to update the current eigenvalue to a next eigenvalue, and drive the interference feature confirmation unit to find all the interference eigenvalues.

Further preferably, the target control parameter updating module includes the following.

A $K_i$ updating unit is used to take a PI stability domain plane coordinate origin (0,0) as a reference point, keep a value $K_p$ constant, give a step size $dk_i$ in a direction $K_i$, and find a next target control parameter (0, $K_i$=$K_i$+$dk_i$) in the direction $K_i$.

A $K_p$ updating unit is used to give a step size $dk_p$ in the direction $K_p$, and update $K_p$=$K_p$+$dk_p$.

$K_p$ is a proportional coefficient and $K_i$ is an integral coefficient.

In a third aspect, the disclosure provides an electronic apparatus, including: at least one memory, used to store a program; and at least one processor, used to execute the program stored in the memory. When the program stored in the memory is executed, the processor is used to execute the method according to the first aspect or any possible implementation manner of the first aspect.

In a fourth aspect, the disclosure provides a computer-readable storage medium storing a computer program. When the computer program is run on a processor, the processor executes the method according to the first aspect or any possible implementation manner of the first aspect.

In a fifth aspect, the disclosure provides a computer program product. When the computer program product is run on a processor, the processor executes the method according to the first aspect or any possible implementation manner of the first aspect.

It can be understood that the beneficial effects from the second aspect to the fifth aspect can be found in the relevant descriptions in the first aspect and will not be described again here.

Generally speaking, compared with the prior art, the above technical solutions conceived by the disclosure have the following beneficial effects.

In the method and the system for calculating the stability margin domain of the control parameter of the hydraulic turbine regulating system provided by the disclosure, the high-order state space model and the zero-pole model of the hydraulic turbine regulating system are established. The dominant eigenvalue and the interference eigenvalue are obtained through the zero-pole distribution diagram, and the participation factor of each state quantity in the hydraulic turbine regulating system to the interference eigenvalue is then calculated. The interference eigenvalue and the strongly correlated state variable thereof can be accurately found, and a source of a sub-wave oscillation of the regulating system can be located and features of the sub-wave oscillation can be understood.

In the method and the system for calculating the stability margin domain of the control parameter of the hydraulic turbine regulating system provided by the disclosure, the interference eigenvalue of the system is judged for the ratio of the participation factor of the system feature under different control parameter conditions being more than 50% according to the strongly correlated state variable of the interference eigenvalue. The accurate positioning of the interference eigenvalue of the system under different control parameters can be implemented. A key judgment indicator is provided for extracting the sub-wave oscillation under different parameters of the complex hydraulic turbine regulating system to reduce the difficulty for operators to comprehensively analyze the system oscillation characteristics. In the method and the system for calculating the stability margin domain of the control parameter of the hydraulic turbine regulating system provided by the disclosure, all the control parameters are traversed according to the fixed step size within a governor PI control parameter stability domain. After eliminating the corresponding interference eigenvalue under each parameter condition, whether the real parts of the remaining eigenvalues are less than the stability margin requirement is judged, and the control parameter set meeting the stability margin requirement is determined to accurately calculate the stability margin domain of the complex hydraulic turbine system, thereby helping the operators intuitively and quickly adjust the control parameters, so that the system meets a control attenuation requirement, and the technical threshold for adjusting the control parameters of the hydraulic turbine regulating system is lowered.

DESCRIPTION OF THE EMBODIMENTS

In order for the objectives, technical solutions, and advantages of the disclosure to be clearer, the disclosure will be further described in detail below with reference to the drawings and the embodiments. It should be understood that the specific embodiments described here are only used to explain the disclosure and are not intended to limit the disclosure.

The term "and/or" in the disclosure describes an association relationship between associated objects, indicating that there may be three relationships. For example, A and/or B may indicate the three cases where A exists alone, A and B exist simultaneously, and B exists alone. The symbol "/" in the disclosure indicates that the associated objects are in an or relationship. For example, A/B indicates A or B.

In the embodiments of the disclosure, words such as "exemplary" or "for example" are used to represent examples, illustrations, or explanations. Any embodiment or design described as "exemplary" or "for example" in the embodiments of the disclosure should not be construed as preferred or advantageous over other embodiments or designs. Rather, the use of the words such as "exemplary" or "for example" is intended to present concepts in a specific manner.

In the description of the embodiments of the disclosure, unless otherwise specified, the meaning of "multiple" refers to two or more than two.

Embodiment 1

The embodiment takes a dual-machine tailwater hydropower system of a hydropower station as a research object. Parameters of the dual-machine tailwater hydropower system of the hydropower station are specifically shown in Table 1.

TABLE 1

| Unit number | Component | Parameter |
|---|---|---|
| 1# | Pressure pipe | $T_{w1} = 1.9559$ s, $r_1 = 0.0296$, $L_1 = 559.6$ m, $A_1 = 83.4$ m$^2$ |
|  | Draft tube | $T_{w2} = 0.4473$ s, $r_2 = 0.0077$, $L_2 = 228.5$ m, $A_2 = 175.4$ m$^2$ $T_{w3} = 2.0105$ s, $r_3 = 0.0029$, $L_3 = 618.7$ m, $A_3 = 83.6$ m$^2$ |
| 2# | Pressure pipe | $T_{w4} = 0.4013$ s, $r_4 = 0.0007$, $L_4 = 252.6$ m, $A_4 = 171.2$ m$^2$ |
|  | Draft tube | $T_c = 272.2$ s, $T_q = 21.5$ s, $F = 1452.2$ m$^2$, $f_c = 45.7$ m$^2$ |
| Public pipe | Pressure regulating well Tailwater tunnel | $T_{wS} = 1.9395$ s, $r_5 = 0.017$, $L_5 = 1031.8$ m, $A_5 = 289.3$ m$^2$ |
| Hydraulic turbine | Rated working condition | $H_r = 202$ m, $Q_r = 538.8$ m$^3$/s, $P_r = 1035$ MW |

TABLE 1-continued

| Unit number | Component | Parameter |
|---|---|---|
| Governor Dynamo | / | Six parameters of hydraulic turbine $[e_y, e_h, e_x, e_{qy}, e_{qh}, e_{qx}] =$ [1, 1.5, −1, 1, 0.5, 0] $K_D = 0.1, T_d = 0.01, b_p = 0.02$ $T_a = 12.07, e_g = 0.176, T_{ae} = 12.07,$ $e_{ge} = 0.176, k_1 = k_2 = 0.5$ |

Figure 1:
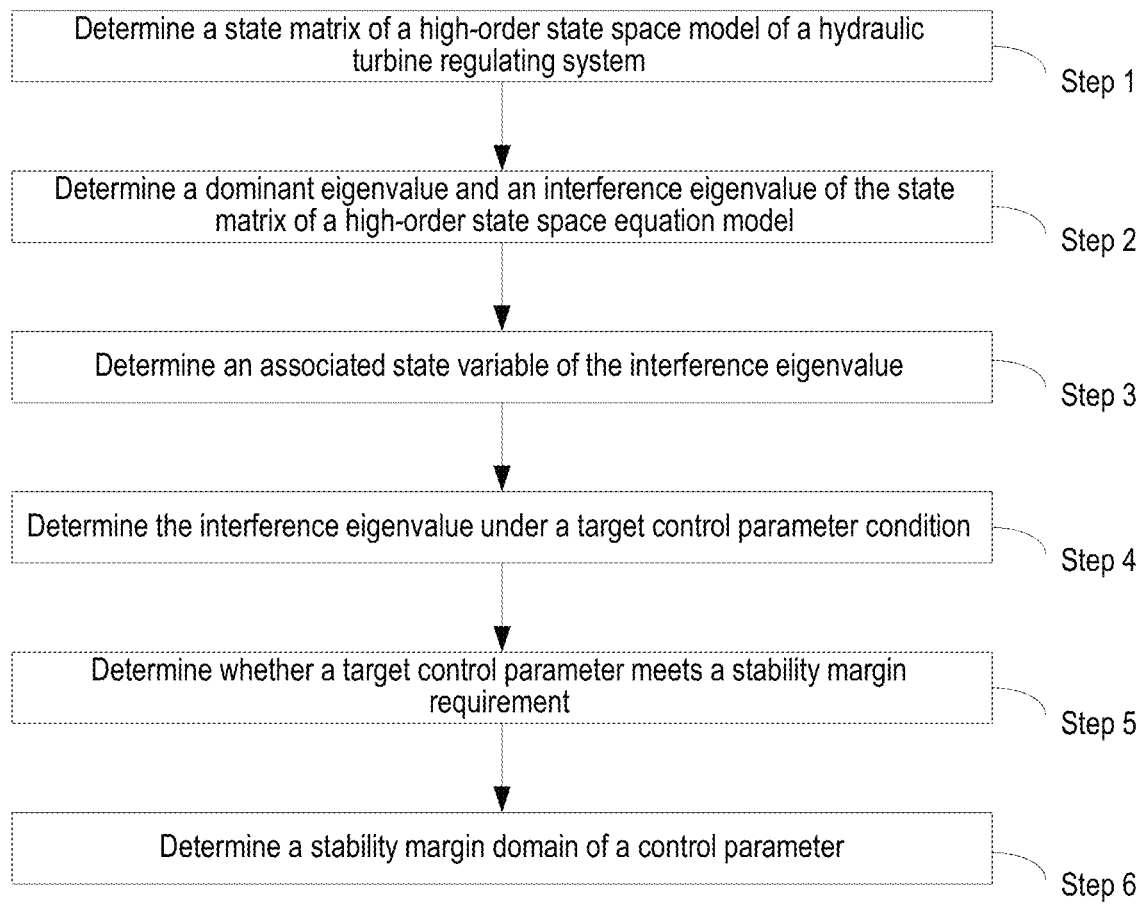
FIG. 1 is a flowchart of a method for calculating a stability margin domain of the control parameters of a hydraulic turbine regulating system provided by an embodiment of the disclosure.

As shown in FIG. 1, the disclosure provides a method for calculating a stability margin domain of the control parameters of a hydraulic turbine regulating system, which includes the following steps.

Figure 2:
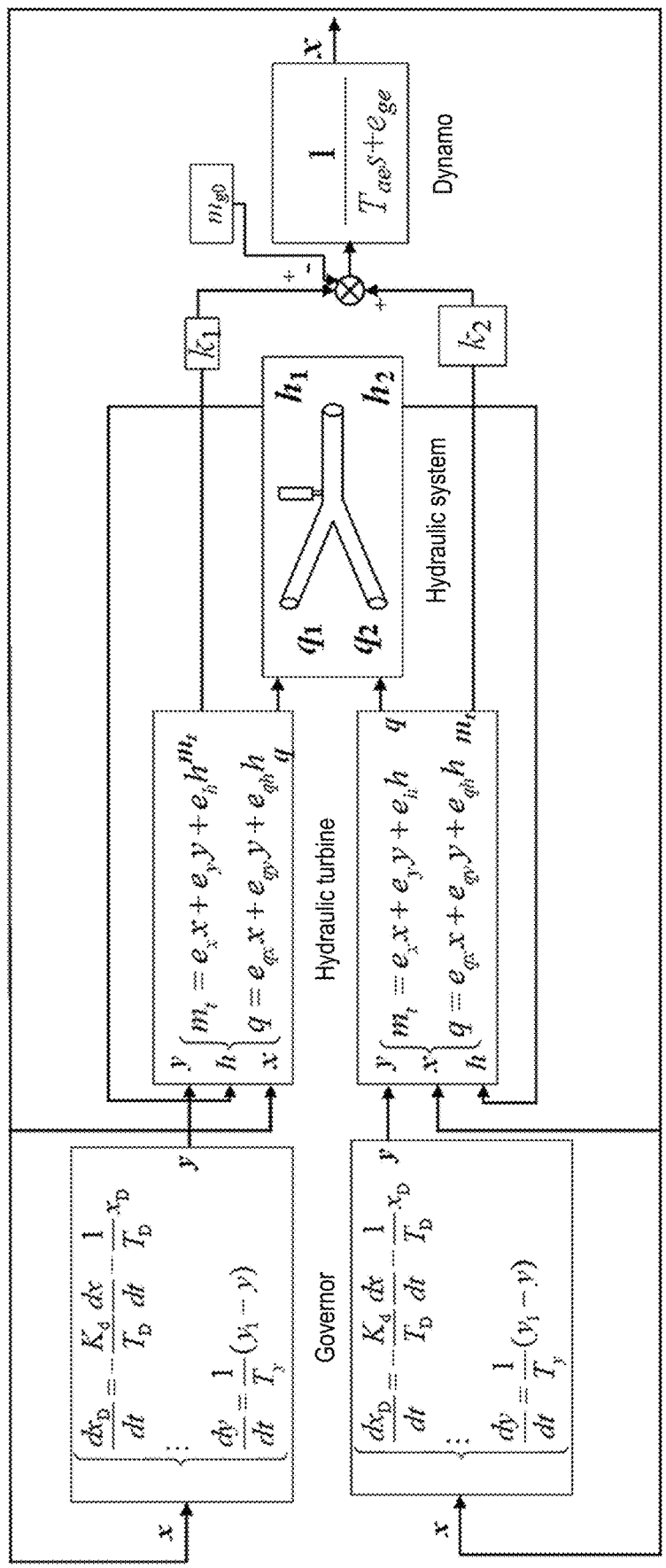
FIG. 2 is a model block diagram of a hydraulic turbine regulating system provided by an embodiment of the disclosure.

In step 1, as shown in FIG. 2, a state matrix of a high-order state space model of the hydraulic turbine regulating system is determined. The hydraulic turbine regulating system includes four modules, a PID governor, a water diversion module including a pressure regulating well, a hydraulic turbine, and a generator. The high-order state space model is used to express a relationship between a state variable of a multi-machine co-pipeline hydraulic turbine regulating system and a system matrix composed of each parameter module through a state equation, and the state matrix of the high-order state space model of the hydraulic turbine regulating system is determined, which is specifically introduced below.

Taking a certain dual-machine co-tailwater hydraulic turbine regulating system as an example, a governor sub-model is expressed as:

$$\begin{cases} \dfrac{dx_D}{dt} = -\dfrac{K_d}{T_D}\dfrac{dx}{dt} - \dfrac{1}{T_D}x_D \\ x_P = K_P(c_1 - x - b_p y_1) \\ \dfrac{dx_I}{dt} = K_i c_1 - K_i x - K_i b_p y_1 \\ \dfrac{dy_1}{dt} = \dfrac{1}{T_{y1}}(x_P + x_I + x_D - y_1) \\ \dfrac{dy}{dt} = \dfrac{1}{T_y}(y_1 - y) \end{cases}$$

where $K_p$ is a proportional coefficient, $K_i$ is an integral coefficient, $K_d$ is a differential coefficient, $T_D$ is a differential time constant, $b_p$ is a permanent slip coefficient, $x_p$, $x_1$, and $x_D$ are respectively a proportional signal, an integral signal, and a differential signal, x is a rotational speed deviation relative value of the unit, $c_1$ is a set rotational speed relative value, $y_1$ and y are respectively an auxiliary relay output signal and a guide vane opening deviation relative value, $T_{y1}$ is an auxiliary relay reaction time constant, and $T_y$ is a main relay reaction time constant.

A water diversion system sub-model including the pressure regulating well may be expressed as:

$$\begin{cases} \dfrac{dq_{t1}}{dt} = \dfrac{1}{T_{w1} + T_{w2}}[-h_{t1} - z_s - (r_1 + r_2)q_{t1}] \\ \dfrac{dq_{t2}}{dt} = \dfrac{1}{T_{w3} + T_{w4}}[-h_{t2} - z_s - (r_3 + r_4)q_{t2}] \\ \dfrac{dq_5}{dt} = \dfrac{1}{T_{w5}}(-r_5 q_5 + z_s) \\ \dfrac{dz_s}{dt} = \dfrac{1}{T_c}\left[q_{t1} + q_{t2} - q_5 + \dfrac{T_q d(q_{t1} + q_{t2} - q_5)}{dt}\right] \end{cases}$$

where $T_{w1}$ and $T_{w2}$ are respectively a water flow inertia time constant of a pressure pipe and a tailwater pipe of Unit No. 1, $T_{w3}$ and $T_{w4}$ are respectively a water flow inertia time constant of a pressure pipe and a tailwater pipe of Unit No. 2, $q_{i1}$ and $q_{i2}$ are respectively a deviation relative value of flow rates of No. 1 and No. 2 hydraulic turbines, $h_{i1}$ and $h_{i2}$ are respectively a deviation relative value of operating heads of No. 1 and No. 2 hydraulic turbines, $r_1$ and $r_2$ are respectively a head loss coefficient of a pressure pipe and a tailwater pipe of Unit 1, $r_3$ and $r_4$ are respectively a head loss coefficient of a pressure pipe and a tailwater pipe of Unit 2, $T_{w5}$, $r_5$, and $q_5$ are respectively a water flow inertia time constant of a tailwater tunnel, a pipe head loss coefficient, and a flow rate deviation relative value, $z_s$ is a head deviation relative value of the pressure regulating well, $T_c$ is a time constant of the pressure regulating well, and $T_q$ is a flow time constant of the pressure regulating well.

A hydraulic turbine sub-model may be expressed as:

$$\begin{cases} q_t = e_{qx}x + e_{qy}y + e_{qh}h_t \\ m_t = e_x x + e_y y + e_h h_t \end{cases}$$

where $m_t$ is a torque deviation relative value of the hydraulic turbine, $q_t$ is a flow deviation relative value of the hydraulic turbine, x is a rotational speed deviation relative value, $h_t$ is a head deviation relative value of the hydraulic turbine, y is a guide vane opening deviation relative value, $e_y$ is a transmission coefficient of hydraulic turbine torque to guide vane opening, $e_x$ is a transmission coefficient of hydraulic turbine torque to rotational speed, $e_h$ is a transmission coefficient of hydraulic turbine torque to working head, $e_{qy}$ is a transmission coefficient of hydraulic turbine flow to guide vane opening, $e_{qx}$ is a transmission coefficient of hydraulic turbine flow to rotational speed, and $e_{qh}$ is a transmission coefficient of hydraulic turbine flow to working head.

A generator and load sub-model may be expressed as:

$$T_{ae}\frac{dx}{dt} = m_{te} - m_{g0} - e_{ge}x$$

$$\begin{cases} T_{ae} = \sum_{i}^{n} k_i T_{ai} \\ m_{te} = \sum_{i}^{n} k_i m_{ti} \\ e_{ge} = \sum_{i=1}^{n} k_i e_{gi} \end{cases}$$

where $T_{ae}$ is an equivalent unit inertia time constant, $m_{te}$ is a deviation relative value of an equivalent active torque of the unit, $m_{g0}$ is a deviation relative value of an equivalent load torque, $e_{ge}$ is a self-adjustment coefficient of an equivalent generator load, $k_i$ is a rated capacity ratio of an i-th unit, $T_{ai}$ is an inertia time constant of the i-th unit, $e_{gi}$ is a self-adjustment coefficient of an i-th generator load, $m_{ti}$ is a deviation relative value of an active torque of the i-th unit, n represents a total of n units, and there are two units here.

Combining the four sub-models above, the state space model of the dual-machine co-tailwater hydraulic turbine regulating system may be expressed as:

$$\begin{cases} \dot{X} = A_{13,13}X_{13,1} + B_{13,3}U_{3,1} \\ Y = C_{1,13}X_{13,1} + D_{1,3}U_{3,1} \end{cases}$$

where $X_{13,1}=[x,y,y',y_1,y_1',x_1,x_1',x_D,x_D',q_r,q_t',q_5,z_s]^T$, $U=[c,c',m_g]^T$, $$A_{13,13} = \begin{bmatrix} a_{11} & \cdots & a_{1,13} \\ \vdots & \ddots & \vdots \\ a_{13,1} & \cdots & a_{13,13} \end{bmatrix},$$

$$B_{13,3} = \begin{bmatrix} b_{1,1} & b_{2l} & b_{31} \\ \vdots & \vdots & \vdots \\ b_{13l} & b_{132} & b_{13,3} \end{bmatrix},$$

$C_{1,13} = [c_{1,1} \ldots c_{1,13}]$, $D_{1,3} = 0$.

where $A_{13,13}$ is a system state matrix, $X_{13,1}$ is a system state vector, $B_{13,3}$ is a control matrix, $U_{3,1}$ is a control vector, $\dot{X}$ is a system state differential vector, Y is a system output, $C_{1,13}$ is a state output matrix, and $D_{1,3}$ is a control output matrix.

where state variables of Unit No. 1 and Unit No. 2 are distinguished by superscript " ", and the variables with the superscript " " represent the variables of Unit No. 2.

$a_{1,1}=-(e_{ge}-k_1 e_x-k_2 e_x'+k_1 e_h e_{qx}/e_{qh}+k_2 e_h' e_{qx}'/e_{qh}')/T_a$, $a_{1,2}=k_1(e_y-e_h e_{qy}/e_{qh})/T_{ae}$ $a_{1,3}=k_2(e_y'-e_h' e_{qy}'/e_{qh}')/T_{ae}$, $a_{1,10}=k_1 e_h/(e_{qh}T_{ae})$, $a_{1,11}=k_2 e_h'/(e_{qh}'T_{ae}')$, $b_{1,3}=-1/T_{ae}$ $a_{2,2}=-1/T_y$, $a_{2,4}=1/T_y$, $a_{3,3}=-1/T_y'$, $a_{3,5}=1/T_y'$ $a_{4,1}=-K_P/T_{y1}$, $a_{4,4}=-(1+K_P b_p)/T_{y1}$, $a_{4,6}=1/T_{y1}'$, $a_{4,8}=1/T_{y1}$, $b_{4,1}=K_P/T_{y1}$ $a_{5,1}=-K_P'/T_{y1}'$, $a_{5,5}=-(1+K_P' b_p')/T_{y1}'$, $a_{5,7}=1/T_{y1}'$, $a_{5,9}=1/T_{y1}'$, $b_{5,2}=K_P'/T_{y1}'$ $a_{6,1}=-K_1$, $a_{6,4}=-K_1 b_p$, $b_{6,1}=K_1$, $a_{7,1}=-K_1'$, $a_{7,5}=-K_1' b_p'$, $b_{7,2}=K_1'$ $a_{8,1}=-K_D/T_d*a_{1,1}$, $a_{8,2}=-K_D/T_d*a_{1,2}$, $a_{8,3}=-K_D/T_d*a_{1,3}$, $a_{8,8}=-1/T_d$ $a_{8,10}=-K_D/T_d*a_{1,10}$, $a_{8,11}=-K_D/T_d*a_{1,11}$, $b_{8,3}=-K_D/T_d*b_{1,3}$ $a_{9,1}=-K_D'/T_d'*a_{1,1}$, $a_{9,2}=-K_D'/T_d'*a_{1,2}$, $a_{9,3}=-K_D'/T_d'*a_{1,3}$, $a_{9,9}=-1/T_d'$ $a_{9,10}=-K_D'/T_d'*a_{1,10}$, $a_{9,11}=-K_D'/T_d'*a_{1,11}$, $b_{9,3}=-K_D'/T_d'*b_{1,3}$ $a_{10,1}=e_{qx}/e_{qh}/(T_{w1}+T_{w2})$, $a_{10,2}=e_{qy}/e_{qh}/(T_{w1}+T_{w2})$, $a_{10,10}=-(r_1+r_2+1/e_{qh})/(T_{w1}+T_{w2})$, $a_{10,13}=-1/(T_{w1}+T_{w2})$ $a_{11,1}=e_{qx}'/e_{qh}'/(T_{w3}+T_{w4})$, $a_{11,3}=e_{qy}'/e_{qh}'/(T_{w3}+T_{w4})$, $a_{11,11}=-(r_3+r_4+1/e_{qh}')/(T_{w3}+T_{w4})$, $a_{11,13}=-1/(T_{w3}+T_{w4})$ $a_{12,12}=-r_5/T_{w5}$, $a_{12,13}=1/T_{w5}$, $a_{13,1}=T_q*(a_{10,1}+a_{11,1})/T_c$, $a_{13,2}=T_q*a_{10,2}/T_c$, $a_{13,3}=T_q*a_{11,3}/T_c$ $a_{13,10}=(1+T_q*a_{10,10})/T_c$, $a_{13,11}=(1+T_q*a_{11,11})/T_c$, $a_{13,12}=-(T_q*a_{12,12}+1)/T_c$, $a_{13,13}=T_q*(a_{10,13}+a_{11,13}-a_{12,13})/T_c$ where except for the elements above, the remaining elements in $A_{13,13}$ and $B_{13,3}$ are all 0.

In step 2, a dominant eigenvalue and an interference eigenvalue of the state matrix of the high-order state space model are preliminarily determined. All conjugate eigenvalues closest to an imaginary axis are found, a zero-pole distribution diagram of the system is analyzed, a conjugate pole closest to the imaginary axis and without any zero nearby is found as a dominant pole, and an eigenvalue closer to the imaginary axis than the dominant eigenvalue is determined as the interference eigenvalue. A more specific introduction is as follows.

Figure 3:
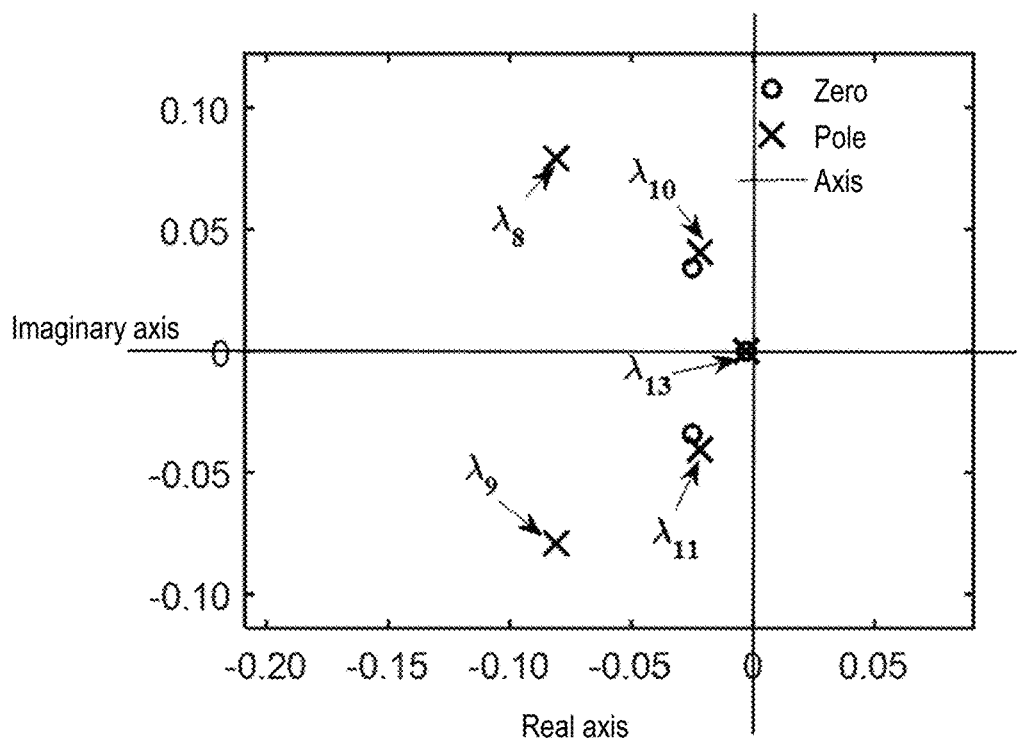
FIG. 3 is a zero-pole distribution diagram of a system provided by an embodiment of the disclosure.

In step 2.1, control parameters ($K_p$=2, $K_i$=0.15) within a PI stability domain are randomly selected, the control parameters and a system parameter (Table 1) are substituted into the high-order state space model to solve for the eigenvalue, and the high-order state space model is then converted into a zero-pole model. The conversion relationship is:

$$sys(A, B, C, D) = sys(P, Z)$$

$$\begin{cases} \lambda_i = \alpha_i + j\beta_i & i = 1, 2, \ldots, 13 \\ p_i = \lambda_i & i = 1, 2, \ldots, 13 \\ z_k = \alpha_k + j\beta_k & k = 1, 2, \ldots, K(K \le 13) \end{cases}$$

where A, B, C, and D are matrices in the state space model, P and Z are respectively a pole and a zero in the zero-pole model, $\lambda_i$ is an i-th eigenvalue of the system, $p_i$ is an i-th pole, $Z_k$ is a k-th zero, $\alpha_i$ is a real part of the eigenvalue $\lambda_i$, $\beta_i$ is an imaginary part of $\lambda_i$, $\alpha_k$ is a real part of the pole $p_i$, and $\beta_k$ is an imaginary part of $p_i$. The eigenvalues are as shown in Table 2, and a zero-pole distribution of the system is as shown in FIG. 3.

Figure 4:
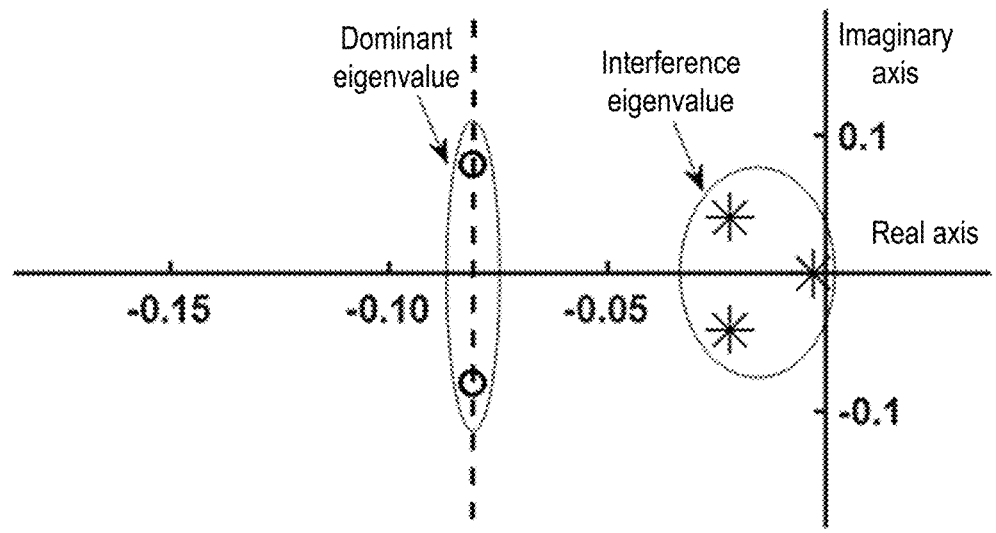
FIG. 4 is a preliminary determination diagram of a system dominant eigenvalue-interference eigenvalue diagram provided by an embodiment of the disclosure.

In Step 2.2, a conjugate eigenvalue $\lambda_{8,9}$ closest to the imaginary axis and without any zero nearby is found according to P and Z in the zero-pole model, and $\lambda_{8,9}$ is used a dominant eigenvalue $\lambda_m = \sigma_m \pm \omega_m j$. The necessary and sufficient condition for the dominant eigenvalue is the conjugate pole closest to the imaginary axis and without any zero nearby. The sufficient condition for the interference eigenvalue is $\sigma_i > \sigma_m$, and an eigenvalue with a real part being greater than the real part of the dominant eigenvalue is an interference eigenvalue $\lambda_g = \sigma_g \pm \omega_g j$. In the embodiment, according to the sufficient condition for the interference eigenvalue further being $\sigma_i > \sigma_{8,9}$, eigenvalues $\lambda_{10,11}$ and $\lambda_{13}$ with real parts being greater than the real part of the dominant eigenvalue are the interference eigenvalues, as shown in FIG. 4.

TABLE 2

| Eigenvalue $\lambda_i$ ($\lambda_i = \sigma_i + \omega_i j$, $\sigma_i$ and $\omega_i$ are real part and imaginary part of eigenvalue) | |
|---|---|
| $\lambda_1$ | −99.9878 |
| $\lambda_2$ | −25.0353 |

TABLE 2-continued

| Eigenvalue $\lambda_i$ ($\lambda_i = \sigma_i + \omega_i j$, $\sigma_i$ and $\omega_i$ are real part and imaginary part of eigenvalue) | |
|---|---|
| $\lambda_3$ | −100 |
| $\lambda_4$ | −24.9971 |
| $\lambda_5$ | −2.3938 |
| $\lambda_6$ | −0.6100 |
| $\lambda_7$ | −0.8432 |
| $\lambda_{8,9}$ | −0.0809 ± 0.0791j |
| $\lambda_{10,11}$ | −0.0220 ± 0.0406j |
| $\lambda_{12}$ | −2.1768 |
| $\lambda_{13}$ | −0.0029 |

In step 3, an associated state variable $x_g$ of the interference eigenvalue is determined. The participation factors of each state variable of the system to the interference eigenvalues ($\lambda_{10,11}$ and $\lambda_{13}$) are calculated. The state variable with a greater participation factor is the main associated state variable of the interference eigenvalue.

It should be pointed out that in step 3, the associated state variable $x_g$ of the interference eigenvalue is judged using the participation factor. The participation factors of all the state variables to the interference eigenvalue are calculated. The state variable with a greater participation factor is the associated state variable $x_g$. A calculation method of the participation factor is:

$$\phi_{i,k} = \left| \frac{v_{i,k} u_{i,k}}{V_k^T U_k} \right|$$

$$V_k^T A = \lambda_k V_k, \quad AU_k = \lambda_k U_k$$

where $\phi_{i,k}$ is a participation factor of an i-th state variable of the system to a k-th eigenvalue, $V_k$ and $U_k$ are respectively a left eigenvector and a right eigenvector corresponding to an eigenvalue $\lambda_k$, and $v_{i,k}$ and $u_{i,k}$ are respectively i-th row elements of $V_k$ and $U_k$. The greater the $\phi_{i,k}$, the stronger the correlation between the i-th state variable and the k-th eigenvalue. Calculation results of the participation factors are shown in Table 3. According to the size of the participation factor, strongly correlated state variables $q_5$ and $z_s$ of the interference eigenvalue $\lambda_{10,11}$ may be determined, and strongly correlated state variables of the interference eigenvalue $\lambda_{13}$ are $x_l$ and $x_l'$.

TABLE 3

| | | 1<br>x | 2<br>y | 3<br>y' | 4<br>$y_1$ | 5<br>$y_1'$ | 6<br>$x_1$ | 7<br>$x_1'$ | 8<br>$x_D$ | 9<br>$x_D'$ | 10<br>$q_{r1}$ | 11<br>$q_{r2}$ | 12<br>$q_{r5}$ | 13<br>$z_{r6}$ |
|---|---|---|---|---|---|---|---|---|---|---|---|---|---|---|
| State variable Participation factor | $\lambda_{10,11}$ | 0.044 | 0 | 0 | 0 | 0 | 0.046 | 0.046 | 0 | 0 | 0.078 | 0.078 | 0.540 | 0.644 |
| | $\lambda_{13}$ | 0 | 0 | 0 | 0 | 0 | 0.5 | 0.5 | 0 | 0 | 0 | 0 | 0 | 0 |

Step 1 to step 3 are mainly to obtain the strongly correlated state variables of the interference eigenvalues. Under different target control parameter conditions, the number of dominant eigenvalues and interference eigenvalues and the corresponding interference eigenvalue positions may change, but the interference eigenvalues are always strongly correlated with the fixed state variables of the system. Therefore, the previously obtained interference eigenvalues may be used as the strongly correlated state variables to calculate the participation factors of the strongly correlated variables in each eigenvalue of the system, and inversely solve for the interference eigenvalues of the system under different control parameters according to the size of the participation factor, thereby preventing the interference eigenvalue positions from changing as the control parameters change.

Figure 5:
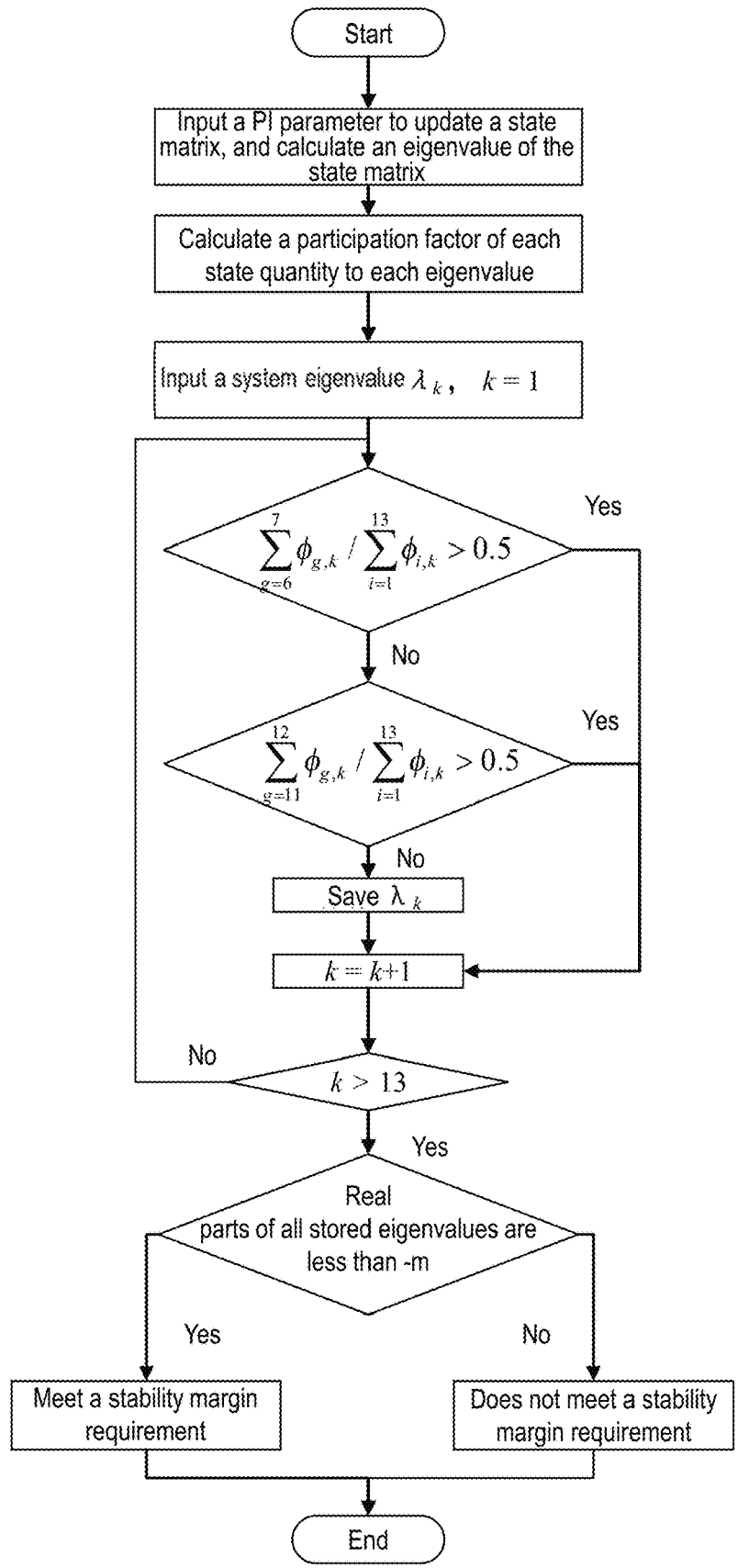
FIG. 5 is a flowchart of judging whether the control parameters meets a stability margin requirement provided by an embodiment of the disclosure.

In step 4, as shown in FIG. 5, the interference eigenvalues under different target control parameter conditions are determined. An eigenvalue of a state matrix under the current PI parameter condition is calculated, wherein if the ratio of the participation factor of the state variable $x_g$ to the eigenvalue is more than 50% of the participation factors of all the state quantities to the eigenvalue, the eigenvalue is the interference eigenvalue.

A more detailed explanation is as follows.

In step 4, the interference eigenvalue of the system under the current PI control parameter condition is determined using the ratio of the main associated state variable of the interference eigenvalue to the participation factor of the eigenvalue. The sufficient condition for the eigenvalue of the system is $$\phi_{g,k} / \sum_{i=1}^{n} \phi_{i,k} > 0.5,$$

that is, if a ratio of a participation factor of a strongly correlated state quantity $x_g$ of the interference eigenvalue to a certain eigenvalue is more than 50% of participation factors of all state quantities to the eigenvalue, the eigenvalue is considered to be the interference eigenvalue of the system under the current control parameters.

The specific operations are as follows.

In step 4.1, a current PI parameter is substituted into the state space model, and a system matrix A is updated to solve for an eigenvalue $\lambda_i$ of the matrix A.

In step 4.2, participation factors $\phi_{i,k}$ of all the state variables to the eigenvalue is calculated using the calculation method of the participation factor in step 3, where i=1 . . . 13, k=1 . . . 13.

In step 4.3, a ratio $$\phi_{g,k} / \sum_{i=1}^{n} \phi_{i,k}$$

of a participation factor of $x_s$ to a certain eigenvalue $\lambda_k$ in the participation factors of all the state variables to the eigenvalue is calculated, and $\lambda_k$ is considered to be the interference eigenvalue if $$\phi_{g,k} / \sum_{i=1}^{n} \phi_{i,k} > 0.5.$$

In the embodiment, the interference eigenvalue among the eigenvalues is excluded. From a 1-st eigenvalue to a 13-th eigenvalue, if a ratio of participation factors of $q_5$ and $z_s$ to a certain eigenvalue is more than 50% of all the state quantities to the eigenvalue, that is, $$\sum_{g=11}^{12} \phi_{g,k} / \sum_{i=1}^{13} \phi_{i,k} > 0.5,$$

or if a ratio of participation factors of $x_l$ and $x_l'$ to a certain eigenvalue is more than 50% of all the state quantities to the eigenvalue, the eigenvalue is excluded.

In step 4.4, the judgment of step 4.3 is performed on each eigenvalue $\lambda_i$ to find all interference eigenvalues $\lambda_g$.

In practical applications, the difference in m represents the speed of the oscillation attenuation rate of the hydraulic turbine. In the prior art, it is impossible to effectively distinguish the interference eigenvalues, and it is difficult to accurately calculate the control parameter range meeting the attenuation speed requirement of the hydraulic turbine regulating system. For some complex systems, such as a multi-frequency oscillation coupled hydraulic turbine regulating system, the prior art cannot solve directly. Therefore, in step 5 and step 6, the positioning method of the interference eigenvalue in step 4 is introduced and the interference eigenvalue is eliminated to overcome the shortcomings of low calculation accuracy and inability to adapt to complex systems in the prior art. A control stability margin domain corresponding to different attenuation requirements m is established. The operators can quickly adjust the control parameters according to the stability margin domain, so that the system meets the attenuation requirements.

In step 5, whether the target control parameter meets the stability margin requirement is determined. Under a target PI parameter condition, whether real parts of all eigenvalues after the interference eigenvalue is removed are less than-m (m represents the stability margin requirement) is determined. If the real part is less than-m, the PI parameter meets the stability margin requirement, and vice versa.

A more specific introduction is as follows.

In step 5, whether the system meets the stability margin requirement is determined using the real parts of the eigenvalues other than the interference eigenvalue. The sufficient condition for the system to meet the stability margin requirement is $\forall \lambda_i \notin \lambda_g, \sigma_i < -m$ (i=1 . . . n). If $\exists \lambda_i \notin \lambda_g, \sigma_i < -m$ (i=1 . . . n), the system does not meet the stability margin requirement, and m is the specific stability margin requirement.

Figure 6:
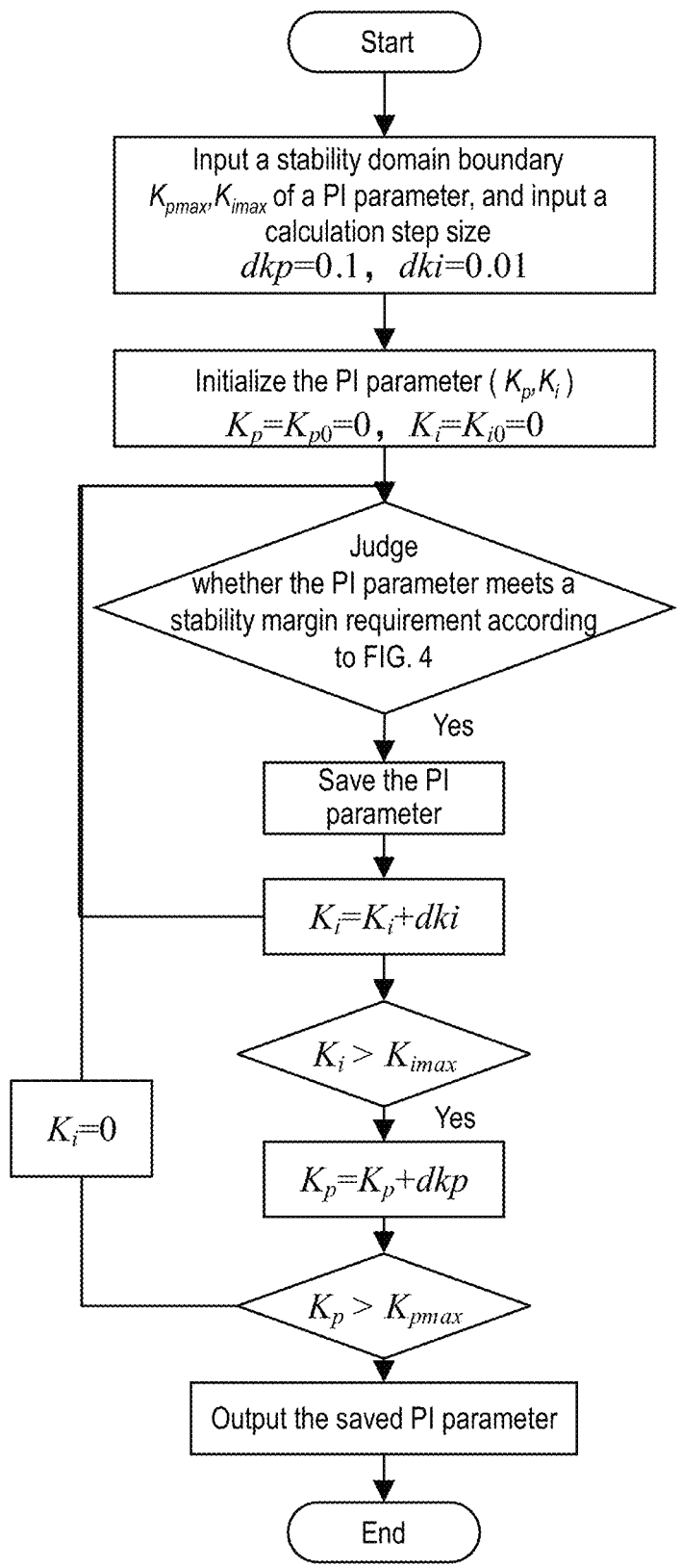
FIG. 6 is a flowchart of solving a stability margin domain of the control parameters provided by an embodiment of the disclosure.

In step 6, as shown in FIG. 6, the stability margin domain of the control parameter is determined. A PI parameter is enumerated within a PI parameter stability domain, whether the PI parameter meets the stability margin requirement is judged according to the above judgment criteria. All PI parameters meeting the stability margin requirement are retained. A set of the parameters is the stability margin domain of the PI parameters.

A more specific introduction is as follows.

In step 6.1, a PI stability domain plane coordinate origin (0,0) is taken as a reference point, a step size $dk_i$ in a direction $K_i$ is given, a next target control parameter (0, $K_i=K_i+dk_i$) in the direction $K_i$ is found and substituted into the high-order state space model, whether the target control parameter meets the stability margin requirement is judged according to step 4 (shown in FIG. 5), and $K_i$ is continuously updated according to $dk_i$ until a critical stability value of the maximum $K_i$ under the current $K_p$ is updated.

Figure 7:
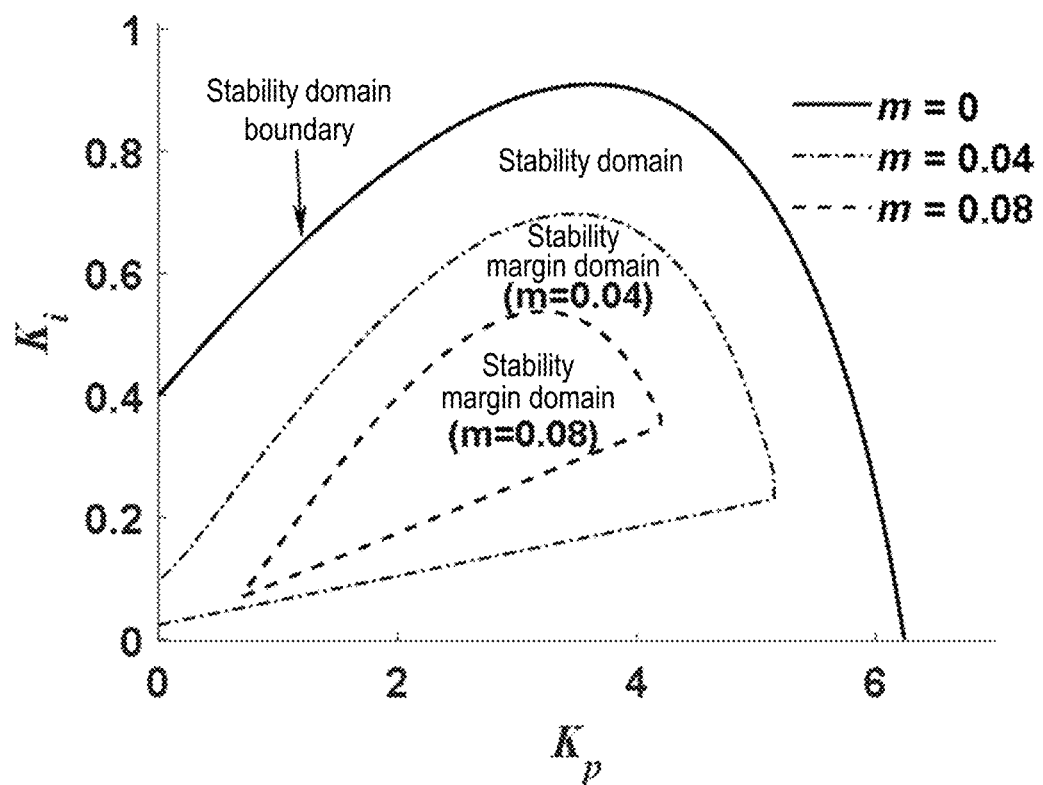
FIG. 7 is a result diagram of solving a stability margin domain of the control parameters provided by an embodiment of the disclosure.
Figure 8:
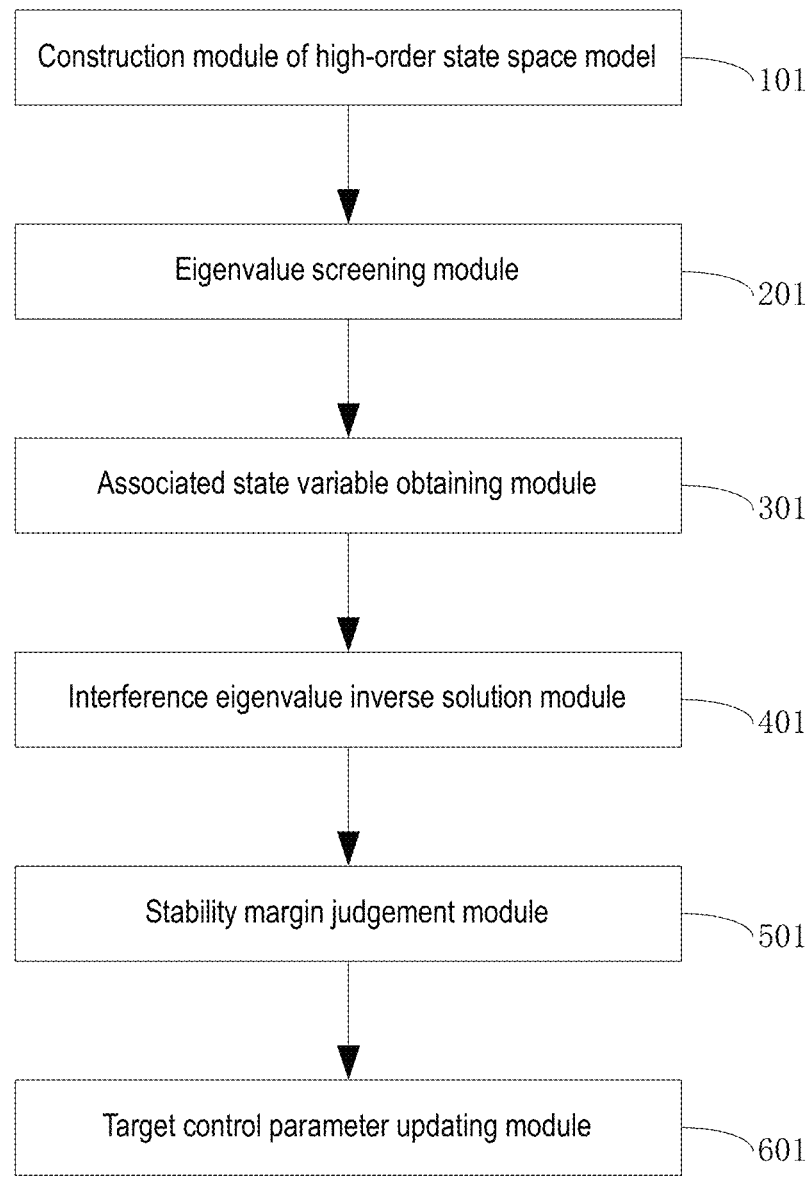
FIG. 8 is a schematic diagram of a system for calculating a stability margin domain of the control parameters of a hydraulic turbine regulating system provided by an embodiment of the disclosure.

In step 6.2, a value $K_p$ is updated, a step size $dk_p=0.1$ in the direction $K_p$ is given, $K_p=K_p+dk_p$ is updated, step 6.1 is repeated, and all the stability values $K_i$ under the current $K_p$ are calculated until $K_p$ reaches the maximum stability value $K_p$. The set of all the control parameters meeting the stability margin requirement is the parameter stability margin domain. Calculation results of the stability margin domain are as shown in FIG. 7.

Embodiment 2

An embodiment of the disclosure provides a system for calculating a stability domain of the control parameters of a hydraulic turbine regulating system, which includes the following.

A construction module 101 of a high-order state space model is used to construct a high-order state space model of the hydraulic turbine regulating system. The hydraulic turbine regulating system includes a PID governor, a water diversion module including a pressure regulating well, a hydraulic turbine, and a generator module.

An eigenvalue screening module 201 is used to randomly select a set of control parameter within a PI stability domain, find a conjugate pole without any zero within a preset distance and closest to an imaginary axis in a zero-pole distribution diagram after converting the high-order state space model as a dominant eigenvalue, and determine an eigenvalue closer to the imaginary axis than the dominant eigenvalue as an interference eigenvalue.

An associated state variable obtaining module 301 is used to calculate a participation factor of each state quantity in the hydraulic turbine regulating system to the interference eigenvalue, and determine the state variable corresponding to the participation factor exceeding a preset value as an associated state variable of the interference eigenvalue.

An interference eigenvalue inverse solution module 401 is used to input a target control parameter into the high-order state space model to calculate an eigenvalue of a state matrix, and judge a certain eigenvalue of the state matrix as the interference eigenvalue if a ratio of a participation factor of the associated state variable to the certain eigenvalue of the state matrix is more than 50% of participation factors of all state variables to the certain eigenvalue of the state matrix.

A stability margin judgement module 501 is used to judge whether a real part of the eigenvalue of the state matrix after removing the interference eigenvalue is all less than-m. If yes, the target control parameter meets a stability margin requirement, where m is the stability margin requirement.

A target control parameter updating module 601 is used to move the control parameters (0,0) according to a step size, and update the target control parameter by adopting the control parameters obtained after each movement.

The set of all the control parameters meeting the stability margin requirement forms the parameter stability margin domain.

Further preferably, the eigenvalue screening module 201 includes the following.

A zero-pole distribution diagram construction unit is used to randomly select the set of the control parameter within the PI stability domain, and substitute the control parameters and a system parameter into the high-order state space model to solve for the eigenvalue; and then convert the high-order state space model into a zero-pole model based on the solved eigenvalue to construct the zero-pole distribution diagram.

An eigenvalue confirmation unit is used to find the conjugate pole closest to the imaginary axis and without any zero nearby as the dominant eigenvalue according to a pole and a zero in the zero-pole distribution diagram, and take the pole or the zero with a real part being greater than a real part of the dominant eigenvalue as the interference eigenvalue.

Further preferably, a calculation method of the participation factor in the associated state variable obtaining module 301 is:

$$\phi_{i,k} = \left| \frac{v_{i,k} u_{i,k}}{V_k^T U_k} \right| \quad V_k^T A = \lambda_k V_k, \, A U_k = \lambda_k U_k$$

where $\phi_{i,k}$ is a participation factor of an i-th state variable of the system to a k-th eigenvalue, $V_k$ and $U_k$ are respectively a left eigenvector and a right eigenvector corresponding to an eigenvalue $\lambda_k$, and $v_{i,k}$ and $u_{i,k}$ are respectively i-th row elements of $V_k$ and $U_k$.

Further preferably, the interference eigenvalue inverse solution module 401 includes the following.

An eigenvalue solution module is used to input the target control parameter into the high-order state space model to solve for the eigenvalue of the state matrix.

A participation factor calculation unit is used to calculate the participation factors of all the state variables to all the eigenvalues using the participation factors.

An interference feature confirmation unit is used to calculate a ratio $$\phi_{g,k} \bigg/ \sum_{i=1}^{n} \phi_{i,k}$$

of a participation factor of a current state variable to a current eigenvalue in the participation factors of all the state variables to the current eigenvalue, and consider the current eigenvalue to be the interference eigenvalue if $$\phi_{g,k} \bigg/ \sum_{i=1}^{n} \phi_{i,k} > 0.5,$$

where $\phi_{g,k}$ is a participation factor of a current g-th state variable to a current k-th eigenvalue and n is a total number of eigenvalues.

An iterative driving unit is used to update the current eigenvalue to a next eigenvalue, and drive the interference feature confirmation unit to find all the interference eigenvalues.

Further preferably, the target control parameter updating module 601 includes the following.

A $K_i$ updating unit is used to take a PI stability domain plane coordinate origin (0,0) as a reference point, keep a value $K_p$ constant, give a step size $dk_i$ in a direction $K_i$, and find a next target control parameter (0, $K_i = K_i + dk_i$) in the direction $K_i$.

A $K_p$ updating unit is used to give a step size $dk_p$ in the direction $K_p$, and update $K_p = K_p + dk_p$.

$K_p$ is a proportional coefficient and $K_i$ is an integral coefficient.

In practical applications, appropriate parameters (Kp and Ki) of a controller need to be set in a governor of a turbine to meet a speed regulating performance requirement (stability margin requirement) of the turbine. According to different stability margin requirements, any corresponding set of controller parameters (Kp and Ki) in the control parameters stability margin domain obtained by the control parameters stability domain calculating system of a turbine regulating system is found as the parameters of the controller, which can ensure that the speed regulation of the PID governor meets actual requirements. More specifically, when regulating the governor, a set of control parameters may be manually selected in the control parameter stability margin domain or the control parameter stability margin domain may be read through a processor in a computer, thereby randomly selecting a set of data to control the PID governor to ensure that the turbine regulating system is within a safe adjustment range of the control parameters, so that the oscillation of the turbine regulating system can quickly attenuate under the premise of ensuring long-term safe and stable operation of the unit.

In summary, compared with the prior art, the disclosure has the following advantages.

In the method and the system for calculating the stability margin domain of the control parameter of the hydraulic turbine regulating system provided by the disclosure, the high-order state space model and the zero-pole model of the hydraulic turbine regulating system are established. Through zero-pole complex plane analysis and participation factor calculation, the interference eigenvalue and the strongly correlated state variable thereof can be accurately found to facilitate locating a source of a sub-wave oscillation of the regulating system and understanding features of the sub-wave oscillation.

In the method and the system for calculating the stability margin domain of the control parameter of the hydraulic turbine regulating system provided by the disclosure, the interference eigenvalue of the system is judged for the ratio of the participation factor of the system feature under different control parameter conditions being more than 50% according to the strongly correlated state variable of the interference eigenvalue. The accurate positioning of the interference eigenvalue of the system under different control parameters can be implemented. A key judgment indicator is provided for extracting the sub-wave oscillation under different parameters of the complex hydraulic turbine regulating system to reduce the difficulty for the operators to comprehensively analyze the system oscillation characteristics.

In the method and the system for calculating the stability margin domain of the control parameter of the hydraulic turbine regulating system provided by the disclosure, all the control parameters are traversed according to the fixed step size within a governor PI control parameter stability domain. After eliminating the corresponding interference eigenvalue under each parameter condition, whether the real parts of the remaining eigenvalues are less than the stability margin requirement is judged, and the control parameter set meeting the stability margin requirement is determined to accurately calculate the stability margin domain of the complex hydraulic turbine system, thereby helping the operators intuitively and quickly adjust the control parameters, so that the system meets a control attenuation requirement, and the technical threshold for adjusting the control parameters of the hydraulic turbine regulating system is lowered.

It should be understood that the above system is used to execute the method in the above embodiment. The corresponding program modules in the system have implementation principles and technical effects similar to those described in the above method. For the working process of the system, reference may be made to the corresponding process in the above method, which will not be described again here.

Based on the method in the above embodiment, an embodiment of the disclosure provides an electronic apparatus. The apparatus may include at least one memory for storing a program and at least one processor for executing the program stored in the memory. When the program stored in the memory is executed, the processor is used to execute the method described in the above embodiment.

Based on the method in the above embodiment, an embodiment of the disclosure provides a computer-readable storage medium. The computer-readable storage medium stores a computer program. When the computer program is run on a processor, the processor executes the method in the above embodiment.

Based on the method in the above embodiment, an embodiment of the disclosure provides a computer program product. When the computer program product is run on a processor, the processor executes the method in the above embodiment.

It can be understood that the processor in the embodiment of the disclosure may be a central processing unit (CPU), other general-purpose processors, digital signal processors (DSP), application specific integrated circuits (ASIC), field programmable gate arrays (FPGA), other programmable logic devices, transistor logic devices, hardware components, or any combination thereof. The general-purpose processor may be a microprocessor or any conventional processor.

The steps of the method in the embodiment of the disclosure may be implemented through hardware or by a processor executing a software command. The software command may be composed of a corresponding software module. The software module may be stored in a random access memory (RAM), a flash memory, a read-only memory (ROM), a programmable ROM (PROM), an erasable PROM (EPROM), an electrically EPROM (EEPROM), a register, a hard disk, a mobile hard disk, a CD-ROM, or any other form of storage medium well-known in the art. An exemplary storage medium is coupled to the processor, so that the processor may read information from the storage medium and write information to the storage medium. Of course, the storage medium may also be an integral part of the processor. The processor and the storage medium may be located in the ASIC.

The above embodiments may be implemented in whole or in part by software, hardware, firmware, or any combination thereof. When implemented using software, the embodiments may be implemented in whole or in part in the form of a computer program product. The computer program product includes one or more computer commands. When the computer program commands are loaded and executed on a computer, processes or functions described according to the embodiments of the disclosure are generated in whole or in part. The computer may be a general-purpose computer, a specific-purpose computer, a computer network, or other programmable systems. The computer command may be stored in a computer-readable storage medium or transmitted through the computer-readable storage medium. The computer command may be transmitted from one website, computer, server, or data center to another website, computer, server, or data center through wired (for example, coaxial cable, optical fiber, and digital subscriber line (DSL)) or wireless (for example, infrared, wireless, microwave, etc.) means. The computer-readable storage medium may be any available medium that can be accessed by a computer or a data storage apparatus such as a server or a data center including one or more available media. The available media may be magnetic media (for example, floppy disk, hard disk, and magnetic tape), optical media (for example, DVD), semiconductor media (for example, solid state disk (SSD)), etc.

It can be understood that various reference numerals involved in the embodiments of the disclosure are only for convenience of description and are not used to limit the scope of the embodiments of the disclosure.

It is easy for persons skilled in the art to understand that the above descriptions are only preferred embodiments of the disclosure and are not intended to limit the disclosure. Any modifications, equivalent substitutions, improvements, etc., made within the spirit and principles of the disclosure should be included in the protection scope of the disclosure.

What is claimed is:

1. A method for calculating a stability margin domain of the control parameters of a hydraulic turbine regulating system, comprising following steps:
   step 1: constructing a high-order state space model of the hydraulic turbine regulating system; wherein, the hydraulic turbine regulating system comprises: a PID governor, a water diversion module comprising a pressure regulating well, a hydraulic turbine, and a generator module;
   step 2: randomly selecting a set of the control parameter within a PI stability domain, finding a conjugate pole without any zero within a preset distance and closest to an imaginary axis in a zero-pole distribution diagram after converting the high-order state space model as a dominant eigenvalue, and determining an eigenvalue closer to the imaginary axis than the dominant eigenvalue as an interference eigenvalue;
   step 3: calculating a participation factor of each state quantity in the hydraulic turbine regulating system to the interference eigenvalue, and determining the state variable corresponding to the participation factor exceeding a preset value as an associated state variable of the interference eigenvalue;
   step 4: inputting a target control parameter into the high-order state space model to calculate the eigenvalue, and judging a certain eigenvalue as the interference eigenvalue if a ratio of the participation factor of the associated state variable to the certain eigenvalue is more than 50% of the participation factor of all the state variables to the certain eigenvalue;
   step 5: judging whether a real part of the eigenvalue after removing the interference eigenvalue is all less than-m, if yes, the target control parameter meets a stability margin requirement; wherein m is the stability margin requirement;
   step 6: moving the control parameter (0,0) according to a step size, updating the target control parameter by adopting the control parameter obtained after each movement, and proceeding the step 4 until all target control parameter sets meeting the stability margin requirement are obtained to form a parameter stability margin domain;
   the step 4 specifically comprises following steps:
   step 4.1: inputting the target control parameter into the high-order state space model to solve for the eigenvalue of a state matrix;
   step 4.2: calculating the participation factor of all the state variable to all the eigenvalue using the participation factor;
   step 4.3: calculating a ratio $$\phi_{g,k} / \sum_{i=1}^{n} \phi_{i,k}$$

of the participation factor of a current state variable to a current eigenvalue in the participation factor of all the state variable to the current eigenvalue, and considering the current eigenvalue to be the interference eigenvalue if $$\phi_{g,k} / \sum_{i=1}^{n} \phi_{i,k} > 0.5;$$

wherein, $\phi_{g,k}$ is the participation factor of a current g-th state variable to a current k-th eigenvalue; n is a total number of the eigenvalue;
   step 4.4: updating the current eigenvalue to a next eigenvalue, and executing step 4.3 until all the interference eigenvalue is found.

2. The method for calculating the stability margin domain of the control parameters of the hydraulic turbine regulating system according to claim 1, wherein the step 2 specifically comprises following steps:
   step 2.1: randomly selecting the set of the control parameter within the PI stability domain, and substituting the control parameter and a system parameter into the high-order state space model to solve for the eigenvalue; and then converting the high-order state space model into a zero-pole model based on the solved eigenvalue to construct the zero-pole distribution diagram;
   step 2.2: finding the conjugate pole closest to the imaginary axis and without any zero nearby as the dominant eigenvalue according to a pole and a zero in the zero-pole distribution diagram, and taking the pole or the zero with the real part being greater than the real part of the dominant eigenvalue as the interference eigenvalue.

3. The method for calculating the stability margin domain of the control parameters of the hydraulic turbine regulating system according to claim 1, wherein a calculation method of the participation factor is:

$$\phi_{i,k} = \left| \frac{v_{i,k} u_{i,k}}{V_k^T U_k} \right| \quad V_k^T A = \lambda_k V_k, \ AU_k = \lambda_k U_k$$

wherein $\phi_{i,k}$ is the participation factor of an i-th state variable of the system to a k-th eigenvalue, $V_k$ and $U_k$ are respectively a left eigenvector and a right eigenvector corresponding to an eigenvalue $\lambda_k$; $v_{i,k}$ and $u_{i,k}$ are respectively i-th row elements of $V_k$ and $U_k$; and A is a system matrix.

4. The method for calculating the stability margin domain of the control parameters of the hydraulic turbine regulating system according to claim 1, wherein the step 6 specifically comprises following steps:
   step 6.1: taking a PI stability domain plane coordinate origin (0,0) as a reference point, keeping a value $K_p$ constant, giving a step size $dk_i$ in a direction $K_i$, finding a next target control parameter (0, $K_i=K_i+dk_i$) in the direction $K_i$ to be substituted into the high-order state space model, judging whether the target control parameter meets the stability margin requirement according to the step 4 and the step 5, and continuously updating $K_i$ according to $dk_i$ until a critical stability value of the maximum $K_i$ under the current $K_p$ is updated;
   step 6.2: giving the step size $dk_p$ in the direction $K_p$, updating $K_p=K_p+dk_p$, returning to the step 6.1, calculating all stability value $K_i$ under the current $K_p$ until $K_p$ reaches the maximum stability value $K_p$; and constructing the set of all the control parameter meeting the stability margin requirement as the parameter stability margin domain, wherein $K_p$ is a proportional coefficient; $K_i$ is an integral coefficient.

5. A system for calculating a stability domain of control parameters of a hydraulic turbine regulating system, comprising:
a construction module of a high-order state space model, used to construct the high-order state space model of the hydraulic turbine regulating system, wherein the hydraulic turbine regulating system comprises a PID governor, a water diversion module comprising a pressure regulating well, a hydraulic turbine, and a generator module;
an eigenvalue screening module, used to randomly select a set of the control parameter within a PI stability domain, find a conjugate pole without any zero within a preset distance and closest to an imaginary axis in a zero-pole distribution diagram after converting the high-order state space model as a dominant eigenvalue, and determine an eigenvalue closer to the imaginary axis than the dominant eigenvalue as an interference eigenvalue;
an associated state variable obtaining module, used to calculate a participation factor of each state quantity in the hydraulic turbine regulating system to the interference eigenvalue, and determine the state variable corresponding to the participation factor exceeding a preset value as an associated state variable of the interference eigenvalue;
an interference eigenvalue inverse solution module, used to input a target control parameter into the high-order state space model to calculate the eigenvalue, and judge a certain eigenvalue as the interference eigenvalue if a ratio of the participation factor of the associated state variable to the certain eigenvalue is more than 50% of the participation factor of all the state variables to the certain eigenvalue;
a stability margin judgement module, used to judge whether a real part of the eigenvalue after removing the interference eigenvalue is all less than −m, if yes, the target control parameter meets a stability margin requirement; wherein m is the stability margin requirement;
a target control parameter updating module, used to move the control parameter (0,0) according to a step size, and update the target control parameter by adopting the control parameter obtained after each movement, wherein
the set of all the control parameters meeting the stability margin requirement forms the parameter stability margin domain;
the interference eigenvalue inverse solution module comprises:
an eigenvalue solution module, used to input the target control parameter into the high-order state space model to solve for the eigenvalue of a state matrix;
a participation factor calculation unit, used to calculate the participation factors of all the state variables to all the eigenvalue using the participation factors;
an interference feature confirmation unit, used to calculate a ratio $$\phi_{g,k} \Big/ \sum_{i=1}^{n} \phi_{i,k}$$

of the participation factor of a current state variable to a current eigenvalue in the participation factor of all the state variable to the current eigenvalue, and consider the current eigenvalue to be the interference eigenvalue if $$\phi_{g,k} \Big/ \sum_{i=1}^{n} \phi_{i,k} > 0.5; \text{ wherein } \phi_{g,k}$$

is a participation factor of a current g-th state variable to a current k-th eigenvalue; n is a total number of the eigenvalue;
an iterative driving unit, used to update the current eigenvalue to a next eigenvalue, and drive the interference feature confirmation unit to find all the interference eigenvalue.

6. The system for calculating the stability domain of the control parameters of the hydraulic turbine regulating system according to claim 5, wherein the eigenvalue screening module comprises:
a zero-pole distribution diagram construction unit, used to randomly select the set of the control parameter within the PI stability domain, and substitute the control parameters and a system parameter into the high-order state space model to solve for the eigenvalue; and then convert the high-order state space model into a zero-pole model based on the solved eigenvalue to construct the zero-pole distribution diagram;
an eigenvalue confirmation unit, used to find the conjugate pole closest to the imaginary axis and without any zero nearby as the dominant eigenvalue according to a pole and a zero in the zero-pole distribution diagram, and take the pole or the zero with the real part being greater than the real part of the dominant eigenvalue as the interference eigenvalue.

7. The system for calculating the stability domain of the control parameters of the hydraulic turbine regulating system according to claim 5, wherein a calculation method of the participation factor in the associated state variable obtaining module is:

$$\phi_{i,k} = \left| \frac{v_{i,k} u_{i,k}}{V_k^T U_k} \right| \quad V_k^T A = \lambda_k V_k, \, A U_k = \lambda_k U_k$$

wherein $\phi_{i,k}$ is the participation factor of an i-th state variable of the system to a k-th eigenvalue, $V_k$ and $U_k$ are respectively a left eigenvector and a right eigenvector corresponding to an eigenvalue $\lambda_k$; $v_{i,k}$ and $u_{i,k}$ are respectively i-th row elements of $V_k$ and $U_k$; and A is a system matrix.

8. The system for calculating the stability domain of the control parameters of the hydraulic turbine regulating system according to claim 5, wherein the target control parameter updating module comprises:
a $K_i$ updating unit, used to take a PI stability domain plane coordinate origin (0,0) as a reference point, keep a value $K_p$ constant, give a step size $dk_i$ in a direction $K_i$, and find a next target control parameter (0, $K_i=K_i+dk_i$) in the direction $K_i$;
a $K_p$ updating unit, used to give the step size $dk_p$ in the direction $K_p$, and update $K_p=K_p+dk_p$,
wherein $K_p$ is a proportional coefficient; $K_i$ is an integral coefficient.

\* \* \* \* \*